US008938500B1

(12) United States Patent
Acharya (10) Patent No.: US 8,938,500 B1
(45) Date of Patent: Jan. 20, 2015

(54) RETRIEVING SOCIAL NETWORK CONTENT (75) Inventor: Anish Acharya, Toronto (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/467,376

(22) Filed: May 9, 2012

(51) Int. Cl.
*G06F 15/16* (2006.01)
*G06Q 99/00* (2006.01)
*G06F 7/00* (2006.01)
*G06F 17/30* (2006.01)

(52) U.S. Cl.
CPC .................. *G06F 17/30867* (2013.01)
USPC ............ 709/204; 705/319; 707/748; 707/741

(58) Field of Classification Search
USPC ............................ 709/204, 206, 207; 705/319
See application file for complete search history.

(56) References Cited

U.S. PATENT DOCUMENTS

| | | | | |
|---|---|---|---|---|
| 6,029,195 | A * | 2/2000 | Herz ............................. | 725/116 |
| 8,407,200 | B2 * | 3/2013 | Wable et al. .................. | 707/706 |
| 2007/0162408 | A1 * | 7/2007 | Ma et al. ........................ | 706/48 |
| 2008/0168048 | A1 * | 7/2008 | Bell et al. ........................... | 707/5 |
| 2009/0234876 | A1 * | 9/2009 | Schigel et al. ................. | 707/102 |
| 2011/0010384 | A1 * | 1/2011 | Luo et al. ...................... | 707/769 |
| 2011/0022621 | A1 * | 1/2011 | Luo et al. ....................... | 707/769 |
| 2011/0208814 | A1 * | 8/2011 | Bostrom et al. ............... | 709/204 |
| 2011/0246457 | A1 * | 10/2011 | Dong et al. .................... | 707/725 |
| 2011/0276632 | A1 * | 11/2011 | Anderson et al. ............. | 709/205 |
| 2012/0136929 | A1 * | 5/2012 | Li et al. .......................... | 709/203 |
| 2012/0215878 | A1 * | 8/2012 | Kidron ........................... | 709/213 |
| 2012/0284251 | A1 * | 11/2012 | Haas et al. ..................... | 707/709 |
| 2013/0054587 | A1 * | 2/2013 | Ahari et al. ..................... | 707/728 |
| 2013/0073387 | A1 * | 3/2013 | Heath ......................... | 705/14.53 |
| 2013/0073389 | A1 * | 3/2013 | Heath ......................... | 705/14.54 |
| 2013/0073400 | A1 * | 3/2013 | Heath ......................... | 705/14.73 |
| 2013/0073473 | A1 * | 3/2013 | Heath ........................... | 705/319 |

* cited by examiner

*Primary Examiner* — Richard G Keehn (57) ABSTRACT

A method includes identifying a target party of a social network based on at least one of a social affinity between an active user of the social network and the target party and a social network interaction history of the active user collecting content specific to the identified target party prior to receiving a request from the active user for content associated with the identified target party, and storing the content in a temporary storage. The method further includes receiving a request by the active user requesting particular content associated with the target party, the particular content among the collected content specific to the identified target party that is stored in the temporary storage. The method also includes providing the collected particular requested content from the temporary storage to the active user, at least in part based on the request by the active user for the particular content.

30 Claims, 7 Drawing Sheets

RETRIEVING SOCIAL NETWORK CONTENT

BACKGROUND

Social networks permit users to post information about themselves and to communicate with other people, e.g., their friends, family, and co-workers. Some social networks permit users to specify friendships with other users. To establish and maintain connections with others, users can interact with social networking services in a number of ways, such as over the Internet, by sending e-mail messages, or by posting content such as micro-blog posts, instant messages, text-based posts, or multimedia correspondence (e.g., photographs or videos).

Based upon user interactions (e.g., a request), structured data can be fetched from a server used by the social network service. For example, when a user clicks on a link embedded with a webpage being presented by a web browser, data associated with the user selection may be fetched and presented (e.g., on a mobile device) to the user.

SUMMARY

In a general aspect, a computer-implemented method includes identifying, using one or more computing devices, a target party of a social network based on at least one of a social affinity between an active user of the social network and the target party and a social network interaction history of the active user. The method also includes collecting, using one or more computing devices, content specific to the identified target party prior to receiving a request from the active user for content associated with the identified target party, and storing, using one or more computing devices, the collected content in a temporary storage. The method further includes receiving, using one or more computing devices, a request by the active user requesting particular content associated with the target party, wherein the particular content is among the collected content specific to the identified target party that is stored in the temporary storage. The method also includes providing, using one or more computing devices, the collected particular requested content from the temporary storage to the active user, at least in part based on in response to the request by the active user for the particular content associated with the target party.

Embodiments may include one or more of the following.

Collecting content specific to the identified target party includes collecting data representative of at least one of recent activity by the target party in the social network, a profile associated with the identified target party, a media file associated with the identified target party, and contact information for the identified target party.

The request by the active user includes an interaction with on a link associated with the identified target party.

Storing the collected content in the temporary storage includes storing the collected content in a storage coupled to a computing device associated with the active user.

The method further includes determining a weight for each of a plurality of parties based on at least one of a social affinity between an active user of the social network and the target party and a social network interaction history of the active user. The target party is identified based on the weight of one or more of the plurality of parties.

The social affinity between an active user of the social network and the target party is based on a topographic distance represented in a social graph between the active user and the target party. The social affinity between an active user of the social network and the target party is based on an interaction between the active user and the target party. The interaction between the active user and the target party is based on at least one of a frequency and a recency of interactions between the active member and the target party.

Identifying a target party includes comparing a characteristic of content associated with the target party and a characteristic of content included in the social network interaction history of the active user.

The social network interaction history represents interactions of the active user during a preselected period of time.

Identifying a target party is based on activity of the target party in the social network. Identifying the target party is based on at least one of the social affinity and the interaction history modified by a feedback parameter representative of a historical performance of an identification of target parties. The feedback parameter is specific to the active user.

The target party is a user of the social network. The target party is an entity having a presence on the social network.

In another general aspect, one or more non-transitory machine-readable media store instructions that are executable by one or more processing devices to perform operations including identifying a target party of a social network based on at least one of a social affinity between an active user of the social network and the target party and a social network interaction history of the active user; collecting content specific to the identified target party prior to receiving a request from the active user for content associated with the identified target party; storing the collected content in a temporary storage; receiving a request by the active user requesting particular content associated with the target party, wherein the particular content is among the collected content specific to the identified target party that is stored in the temporary storage; and providing the particular requested content from the temporary storage to the active user, at least in part based on the request by the active user for the particular content associated with the target party.

Embodiments may include one or more of the following.

Collecting content specific to the identified target party includes collecting data representative of at least one of recent activity by the target party in the social network, a profile associated with the identified target party, a media file associated with the identified target party, and contact information for the identified target party.

The request by the active user includes an interaction with a link associated with the identified target party.

Storing the collected content in the temporary storage comprises storing the collected content in a storage coupled to a computing device associated with the active user.

The instructions are executable by the one or more processing devices to perform operations further including determining a weight for each of a plurality of parties based on at least one of a social affinity between an active user of the social network and the target party and a social network interaction history of the active user. The target party is identified based on the weight of one or more of the plurality of parties.

The social affinity between an active user of the social network and the target party is based on a topographic distance represented in a social graph between the active user and the target party. The social affinity between an active user of the social network and the target party is based on an interaction between the active user and the target party.

Identifying the target party is based on at least one of the social affinity and the interaction history modified by a feedback parameter representative of a historical performance of an identification of target parties.

In a further general aspect, a system includes an identification module configured to perform operations including identifying a target party of a social network based on at least one of a social affinity between an active user of the social network and the target party and a social network interaction history of the active user. The system also includes a content retrieval module configured to perform operations including collecting content specific to the identified target party prior to receiving a request from the active user for content associated with the identified target party, storing the collected content in a temporary storage, receiving a request by the active user requesting particular content associated with the target party, wherein the particular content is among the collected content specific to the identified target party that is stored in the temporary storage, and providing the particular requested content from the temporary storage to the active user, at least in part based on the request by the active user for the particular content associated with the target party.

Embodiments may include one or more of the following.

Collecting content specific to the identified target party includes collecting data representative of at least one of recent activity by the target party in the social network, a profile associated with the identified target party, a media file associated with the identified target party, and contact information for the identified target party.

The request by the active user includes an interaction with a link associated with the identified target party.

Storing the collected content in the temporary storage comprises storing the collected content in a storage coupled to a computing device associated with the active user.

The identification module is further configured to perform operations including determining a weight for each of a plurality of parties based on at least one of a social affinity between an active user of the social network and the target party and a social network interaction history of the active user. The target party is identified based on the weight of one or more of the plurality of parties.

The social affinity between an active user of the social network and the target party is based on a topographic distance represented in a social graph between the active user and the target party.

Identifying the target party is based on at least one of the social affinity and the interaction history modified by a feedback parameter representative of a historical performance of an identification of target parties.

Particular embodiments of the disclosed technologies can be implemented to realize one or more of the following advantages. Retrieving social network content prior to a request for the content by a user of the social network reduces perceived latency when the user requests the retrieved content, thus providing an improved social network browsing experience for the user. Because content is identified for retrieval based on factors such as social affinity and user interaction with the social network, there is a reasonable likelihood that the retrieved content may actually be requested by the user. As a result, client-side and server-side costs due to overly aggressive caching of data can be reduced while providing improved service to the user. Furthermore, the identification of content to be retrieved can be tuned over time (e.g., on a system-wide level, a per-user basis, etc.), thus enabling the accuracy and efficiency of the content retrieval system to continue to improve.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Definitions

The term "social networking service" as used herein encompasses its plain and ordinary meaning, including, but not limited to, a platform that promotes building of social connections, e.g., among people with shared interests and/or activities.

The term "social connection" as used herein encompasses its plain and ordinary meaning, including, but not limited to, a relationship between nodes in a graph representing users of the social networking service.

The term "social graph" as used herein encompasses its plain and ordinary meaning, including, but not limited to, a graphical representation of social connections between two parties or connections between parties and content in a social networking service.

The term "social affinity" as used herein encompasses its plain and ordinary meaning, including, but not limited to, a closeness of two parties on a social graph.

The term "party" as used herein encompasses its plain and ordinary meaning, including, but not limited to, a user or entity having a presence in a social networking service.

The term "interaction history" as used herein encompasses the its plain and ordinary meaning, including, but not limited to, a record of resources accessed by a user.

The term "processing device" as used herein encompasses its plain and ordinary meaning, including, but not limited to, one or more microprocessors, microcontrollers and/or programmable or non-programmable logic that is capable of receiving and storing data, and of communicating over a network.

The term "computing device" as used herein encompasses its plain and ordinary meaning, including, but not limited to, a programmable machine that is capable of receiving input data, processing the data, and providing an output.

Overview

Described herein are techniques to collect content likely to be of interest to a user of a social network prior to the user requesting the content from the social network. More particularly, a target party (e.g., another social network user, a blog, a news feed, a product page, or another target party) is identified as being associated with content that is likely to be accessed by the user. The target party may be identified based on, e.g., a social relationship between the user and the target party and/or the user's interaction history with the social network. Content specific to the target party, such as a social network profile, activity stream, media files, or contact information, may be collected (referred to herein as "pre-fetched") by the user's client computing device and stored locally on the client device. When the user requests some or all of the pre-fetched content, for instance by clicking on a link to that content, the content has already been retrieved from the server and thus can be quickly and efficiently provided to the user.

Social relationships incorporate both static components (e.g., Michael is one of Jane's contacts) and dynamic components (e.g., Jane is upset with Michael and has not visited his profile in a month). Both static social data, such as the structure of a user's social graph, and dynamic social data, such as the content a user has viewed recently or the content the user views frequently, are used as inputs for the selection of a target party. For instance, a direct contact of a user (i.e., another user to whom the user is directly connected) may be weighted more heavily as a potential target party than a contact-of-a-contact (e.g., a friend of a friend). As another example, if a user generally tends to view content for only a few select family members but has recently viewed profiles of several college friends, the weighting of the user's college friends as potential target parties may be increased.

Retrieving social network content prior to a request for the content reduces perceived latency when the user requests the retrieved content, thus providing an improved social network browsing experience for the user. Because content is identified for retrieval based on factors such as social affinity and user interaction with the social network, there is a reasonable likelihood that the retrieved content may actually be requested by the user. As a result, client-side and server-side costs due to overly aggressive caching of data can be reduced while providing improved service to the user. Furthermore, the identification of content to be retrieved can be tuned over time (e.g., on a system-wide level, a per-user basis, etc.), thus enabling the accuracy and efficiency of the content retrieval system to continue to improve.

Example Network Environments

The techniques described herein may be implemented in an appropriate network environment, with appropriate devices and computing equipment. An example of such an environment is described below.

Figure 1:
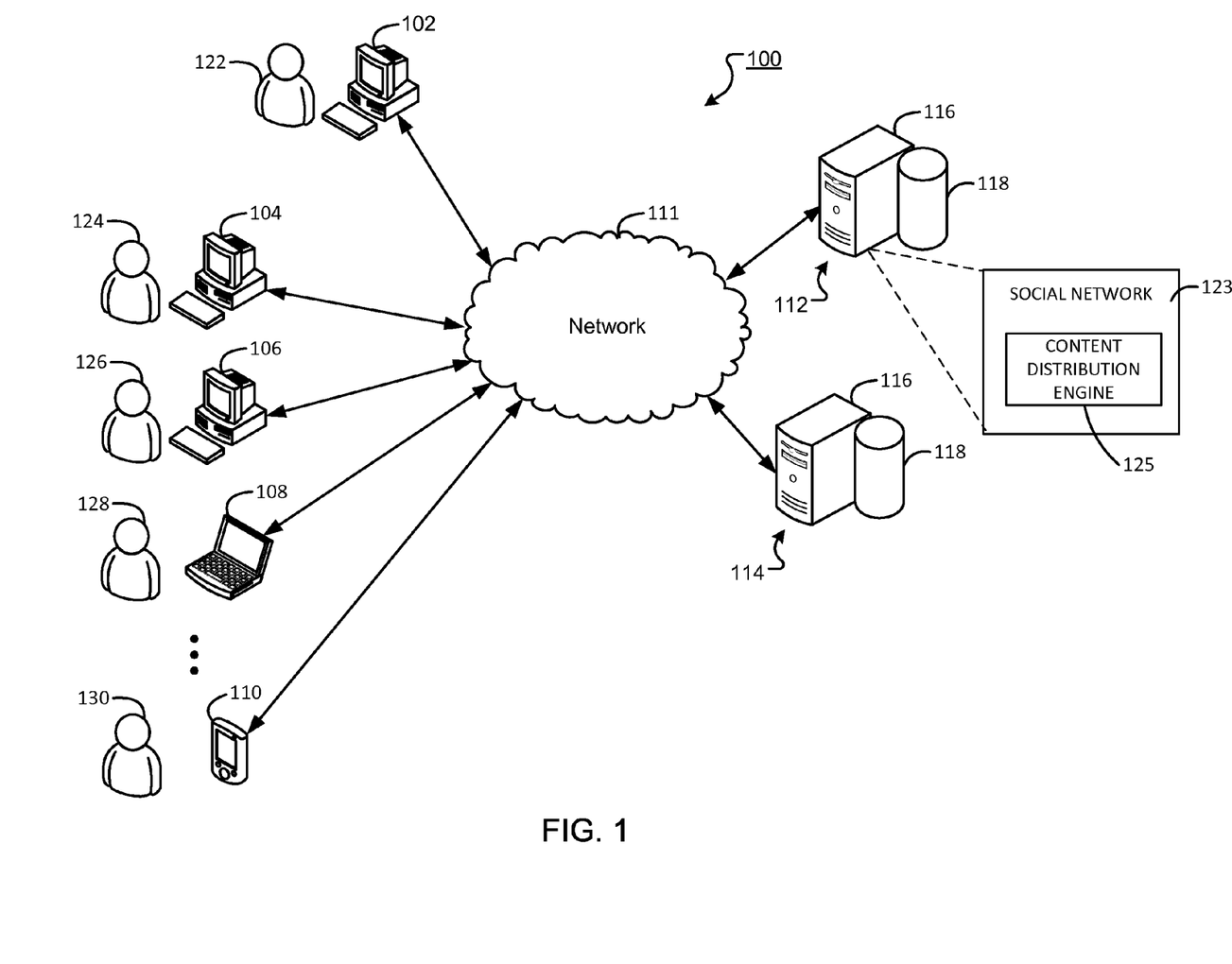
FIG. 1 is a block diagram showing an example of a network environment.

FIG. 1 is a block diagram showing an example of a network environment 100 on which the techniques described herein may be implemented. Network environment 100 includes computing devices 102, 104, 106, 108, 110 that are configured to communicate with a first server system 112 and/or a second server system 114 over a network 111. Computing devices 102, 104, 106, 108, 110 have respective users 122, 124, 126, 128, 130 associated therewith. The first and second server systems 112, 114 each includes a computing device 116 and a machine-readable repository, or database 118. Example environment 100 may include many thousands of Web sites, computing devices and servers, which are not shown.

Network 111 may include a large computer network, examples of which include a local area network (LAN), wide area network (WAN), the Internet, a cellular network, or a combination thereof connecting a number of mobile computing devices, fixed computing devices, and server systems. The network(s) included in network 111 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 102, 104, 106, 108, 110 enable respective users 122, 124, 126, 128, 130 to access and to view documents, e.g., Web pages included in Web sites. For example, user 122 of computing device 102 may view a Web page using a Web browser. The Web page may be provided to computing device 102 by server system 112, server system 114 or another server system (not shown).

In example environment 100, computing devices 102, 104, 106 are illustrated as desktop-type computing devices, computing device 108 is illustrated as a laptop-type computing device 108, and computing device 110 is illustrated as a mobile computing device. It is noted, however, that computing devices 102, 104, 106, 108, 110 may include, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, a television with one or more processors embedded therein and/or coupled thereto, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 102, 104, 106, 108, 110 can participate in a social network 123 hosted, e.g., by the server system 112, by uploading and downloading electronic content to the social network. The electronic content may include, e.g., text comments (e.g., updates, announcements, replies), digital images, videos, audio files, and/or other appropriate information. In some implementations, information can be posted on a user's behalf by systems and/or services external to social network 123 or to server system 112. For example, the user may post a review of a movie to a movie review Web site, and with proper permissions, that Web site may cross-post that review to social network 123 on the user's behalf. The user may include, with a post, a tag, which includes a hyperlink to a discussion forum about a particular topic (e.g., the movie). The tag typically relates to the topic of the post (although that need not be the case always). The discussion forum contains posts by the user and others who have included similar tags on their posts.

Generally, users interacting with the computing devices 102, 104, 106, 108, 110 can also use social network 123 to define social circles to organize and to categorize the user's relationships to other users of the social network. The social circles become part of the user's social connections. Electronic content can be distributed to contacts within social network 123, including one or more social circles, so that such content is viewable by the indicated contacts and/or contacts, or others. In an example operation, a user of social network 123 can generate content and indicate, e.g., one or more individual social network contacts and/or social circles to which the generated content is to be distributed. During a content write-time, a content data set is transmitted from the user's client computing device (e.g., computing device 102 of FIG. 1) to a distribution hub (e.g., a content distribution engine 125), which can be provided at a server (e.g., server system 112 of FIG. 1 or elsewhere on the network). In some implementations, the content data set may include content data (e.g., text, identity of the content author, tag, uniform resource indicator (URI), timestamp data (e.g., a timestamp indicating the time that the content was generated)), distribution data (e.g., data identifying contacts and/or one or more social circles), and identification (ID) data (e.g., an ID assigned to the content data set upon generation of the content).

In some implementations, other data can be appended to content data sets. Example other data can include scoring data. In some examples, scoring data can include a social affinity score among other possible scoring data. As described in more detail below, affinity identifies the closeness of parties on a social graph.

The scoring data may be recipient specific. For example, the scoring data can include social affinity data that is provided based on respective social affinity scores between an author of the content and each recipient of the content. For example, a first user can author content and define a distribution of the content, thereby creating an underlying content data set. The distribution can include a second user and a third user, and so forth. A first social affinity score associated with a social relationship between the first user and the second user can be provided, and a second social affinity score associated with a social relationship between the first user and the third user can be provided. The first social affinity score can be different from the second social affinity score, reflecting different social relationships between the first user and the second user and the first user and the third user. The first social affinity score and the second social affinity score can be appended to the content data set and/or stored in another location while maintaining an association with the content data set.

In some implementations, the distribution data is processed to provide an access control list (ACL) that specifies which contacts within the social network are granted access to the content. In some implementations, content-associated social affinity scores can be processed to provide the ACL. For example, distribution data can indicate that content is to be accessible by, and/or distributed to, a particular user. A social affinity score can be determined for the content and can be specific to a relationship between the content recipient and the author of the content. In some examples, if the social affinity score is below a threshold score, it is determined that the content will not be accessible by, and/or distributed to, the particular user. Consequently, in this example, although the particular user had been explicitly targeted for distribution of the content by the author, the particular user is not provided in the ACL for the content. In some examples, if the social affinity score is at or above the threshold score, it is determined that the content will be accessible by, and/or distributed to, the particular user. Consequently, the particular user has been explicitly targeted for distribution of the content by the author and the particular user is provided in the ACL for the content.

Generally, the distribution hub determines end points to which the content data set is to be distributed based, e.g., on the ACL. For example, the set of contacts that may care about the content and/or that are allowed access to the content is determined based on the ACL, and the ID of the content is written to a per user/view index at the distribution hub. When fetching content to distribute to a user, the user/view index is accessed and the IDs of the various contents that the user is allowed to view are determined. The content data sets are retrieved from a data store (e.g., data store 118 of FIG. 1) and are transmitted to a client device associated with the requesting user. In some implementations, the ACL can be provided based on an overall score, a quality score and/or the social affinity score. Content may be distributed to a user's main page for inclusion in a content stream.

Example Social Network Environments

Figure 2:
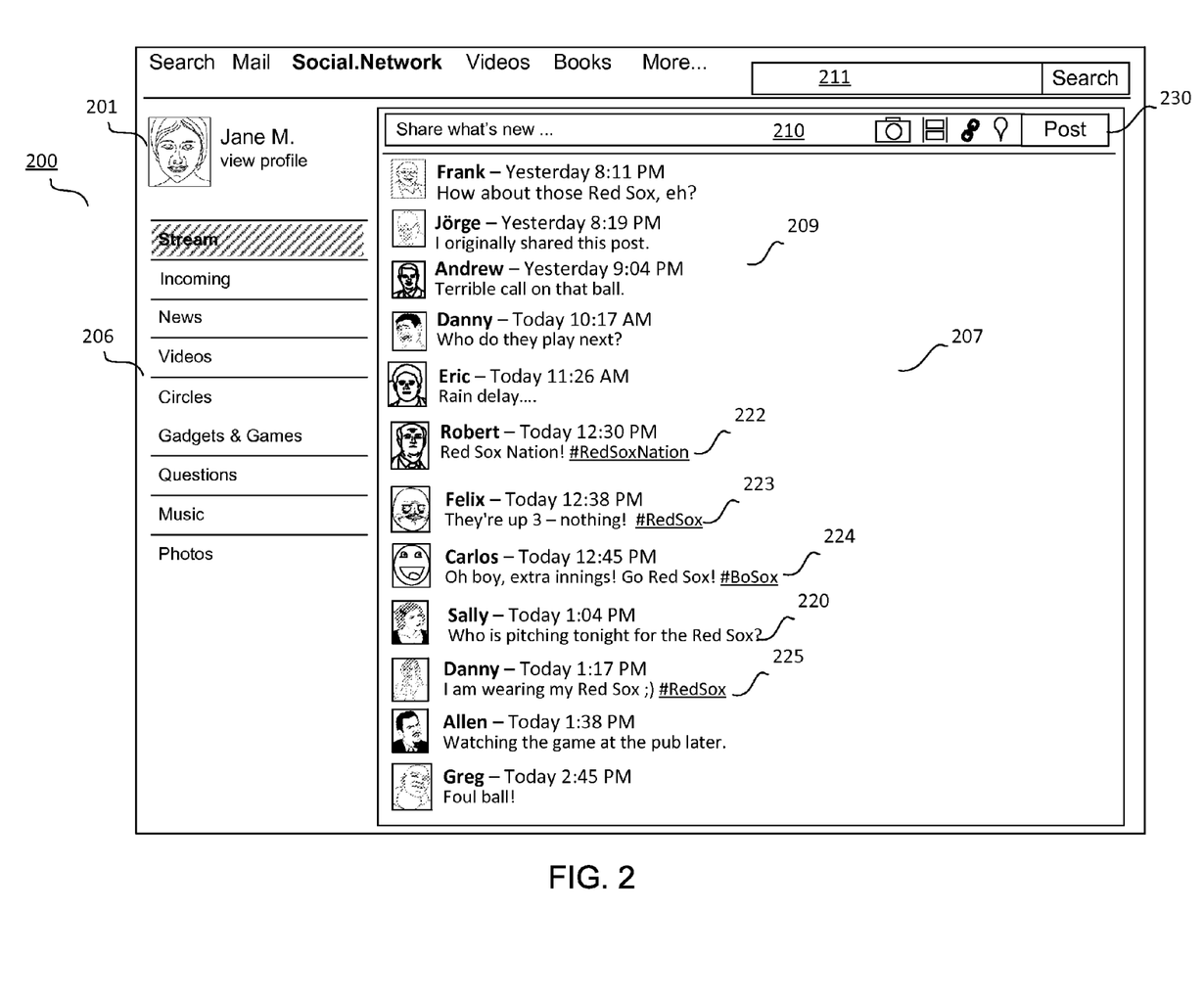
FIG. 2 is an example of a main page for a user of a social network.

FIG. 2 shows an example main page 200 for a member of a social network. For example, page 200 can be provided as a Web page within a Web site of social network 123, and can display electronic content that has been shared with a member 201 associated with the page 200. In the illustrated example, the member is "Jane McDavies" and page 200 displays items (e.g., electronic content) that other members have shared with the member and/or items that the member has shared with other members. As shown in the figure, this content includes various tags 220, 222, 223, 224, 225. Page 200 also includes a social network menu 206 and a content stream 207, in which items of content are presented. Example content items 209 that have been distributed to the member are displayed in the content stream. Generally, items 209 displayed in content stream 207 include electronic content that is distributed to the member from contacts established within the social network. A content sharing interface 210 can also be provided on page 200. The member can activate (e.g., click on) the interface 210 to input electronic content. Although twelve content items are depicted in FIG. 2, it is appreciated that page 200 can display more or less than twelve content items to the member. A search field 211 can also be provided on page 200 to search social network 123 for content. In the above example, a member may make a post, either in their own content stream or elsewhere.

Figure 3:
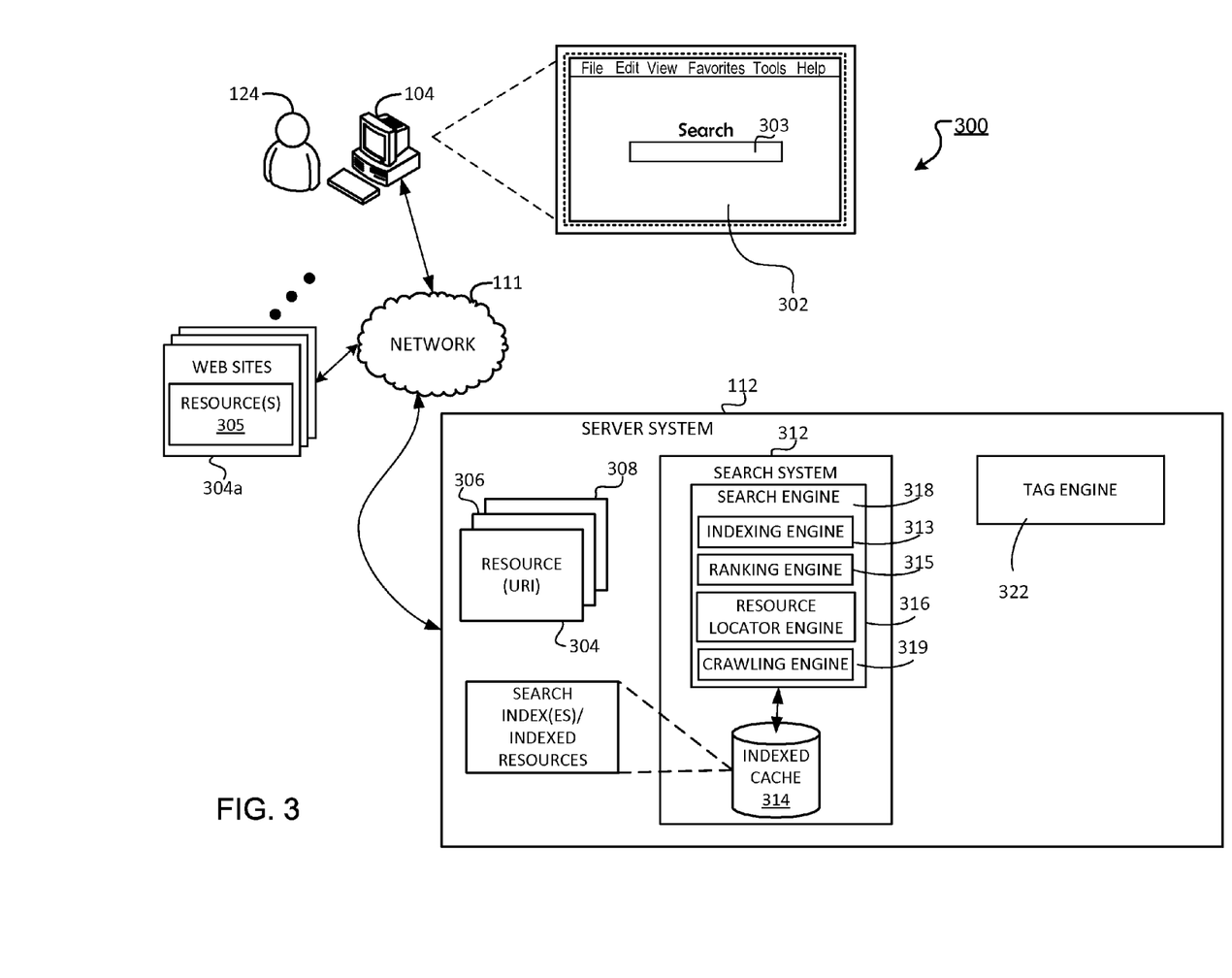
FIG. 3 is a block diagram of an example of part of the network environment of FIG. 1.

FIG. 3 is a block diagram of an example part of the network environment of FIG. 1. Specifically, FIG. 3 shows portion 300 of example network environment 100. In this example implementation, server system 112 stores resources 304, 306, 308. A resource has an associated resource identifier (Resource ID). For example, resources 304, 306, 308 may correspond to different Web pages of the same Web site, or may correspond to Web pages of different Web sites. As explained below, in this example operation, computing device 104 communicates with server system 112 to display a home Web page ("home page") 302 of a search engine Web site and a home page of a social network (e.g., page 200 of FIG. 2 containing the user's content stream).

To view a Web page, user 124 may input or select a Resource ID using a Web browser that is executed on computing device 104. The Resource ID may include, for example, a URI or a uniform resource locator (URL). A request including the Resource ID is transmitted from computing device 104 to server system 112 over network 111. In response, the server system identifies the requested resource based on the Resource ID, and transmits the requested resource to computing device 104 over network 111. For example, the resource may be home page 200 of social network 123 or a home page 302 of search system 312. In some implementations, search system 312 is part of social network 123 or it is independent thereof yet able to access content from social network 123.

Page 302 for search system 312 may include a field 303 for inputting a search query that is transmitted to the search system. The search query may include, e.g., one or more terms, images, audio, video, or other content. In response, the search system performs a search of an indexed cache containing one or more search indexes, and returns a search results list to a user. The search results list may include, e.g., links to content that is deemed relevant to the search terms. Search system 312 may be implemented, e.g., on server system 112 as shown or on other appropriate hardware. Search system 312 includes a search engine 318 and one or more search indexes. Search system 312 identifies resources 305 (e.g., Web pages, images, news articles, user-generated content, social information (e.g., from social network 123), or other public and/or private resources) provided by content publishers on Web sites 304a. Appropriate permission(s) may be required to access non-public content.

Search system 312 includes a crawling engine 319 to crawl resources, and an indexing engine 313 to index those resources in one or more search indexes (referred to collectively as "search index") stored, e.g., in indexed cache 314. Search engine 318 also includes a resource locator engine 316 for identifying resources within the search index that are responsive to, and that may be relevant to, a query (for example, by implementing a query text matching routine). A ranking engine 315 ranks resources deemed relevant to the search query.

Social graph information may be included in a same search index as other resources or in a separate search index (not shown). As described in more detail below, the social graph information may include, e.g., comments, endorsements, connections, affinities, and so forth related to indexed content and to a user's social graph. The social graph information may include content from social network 123. A separate search may be performed for general search results responsive to a query, as well as particular search results, that identify resources associated with the user's social graph (e.g., endorsed Web content).

In some implementations, information associated with the user's social graph may be indexed by generating and incorporating suitable data structures, e.g., social restricts, into an existing search index. In some examples, the indexing engine may generate social restricts by mapping identified information to corresponding Web resources referenced in a search index and determining the social connection between the Web resources and the user. For example, the system may access a relationship lookup table that includes relationship data describing a user's social graph to determine such social connections. In some examples, social restricts may be provided in the form of an information tag or other data associated with a referenced Web resource included in the search index.

User-generated content (e.g., social network content) may be included in a same index as other resources or in a separate index, as noted above. In this regard, with appropriate permission, crawling engine 319 may crawl user-generated content (of both the searcher and others, e.g., members of the searcher's social graph), and indexing engine 313 may incorporate that content into an appropriate search index. Resource locator engine 316 may identify that user-generated content based, e.g., on a relevance score of the user-generated content to a search query and based, e.g., on other information, including, e.g., the social connection of the searcher to the content itself or to an author of the content. In this regard, the existence or non-existence of a social connection to the content or author may affect the relevance score. In this context, an author is not limited to one who created the content, but may include, e.g., anyone who interacted with the content, shared the content, endorsed the content, posted the content, and so forth.

In response to a search query, search engine 318 may access indexed cache 314 to identify resources 305 that are relevant to the search query. Resource locator engine 316 may identify resources 305 in the form of search results and return the search results to a requesting device in search results pages. A search result may include data generated by search system 312 that identifies a resource 305, and that includes a link to the corresponding resource, along with images, video, or other appropriate content. An example search result may include a Web page title, a snippet of text or a portion of an image obtained from the Web page, and the URL of the Web page. In some cases, the search results may also include social information. For example, included with some of the search results may be comments, endorsements, or other information obtained about the search results from a user's social graph. The search results may also include user-generated content displayed alone or in association with relevant social information (e.g., a link to a content author's profile). Search results may be displayed in a user's content stream along with other content. For example, a user may conduct a search of the social network from their main page, and the results may be displayed in their content stream along with others' posts.

As noted above, a social graph is a way to represent, graphically, social connections between two parties that may, or may not, be on the same social network, and to represent connections between parties and content. A party may be an individual or an entity, e.g., a company, organization, country, or the like. Types of connections in social graphs may include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph may include connections within a single network or across multiple networks.

Distinct social graphs may be generated for different types of connections. For example, a user may be connected with chat contacts in one social graph, electronic message contacts in a second social graph, and connections from a particular social network in a third social graph. A social graph may include edges to additional parties at greater degrees of separation from the user. For example, an electronic message contact may have its own electronic message contacts to others adding a degree of separation from the user (e.g., user→electronic message contact→contact of electronic message contact). These contacts may, in turn, may have additional contacts at another degree of separation from the user. Similarly, a party's connection to someone in a particular social network may be used to identify additional connections based on that person's connections. Distinct social graphs may include edges connecting one or more social graph to one or more other social graphs. Thus, a social graph may include a single social graph or multiple interconnected social graphs.

As noted, users may designate content as endorsed, share or comment on content, quote URLs, or otherwise indicate an interest or liking of content, examples of which include, but are not limited to, a particular resource, Web page, or search result. For example, an application, widget, or scripting may be provided in search results pages, Web pages, or within a browser application that allows a user to indicate liking, sharing, or other evaluation of an associated resource or search result. The user may mark the particular resource, Web site, or search results to indicate endorsement or other evaluation (e.g., through a browser control or user interface element presented with the associated content). Such relationships to information from others may be captured in a user's social graph.

Affinity between entities of a social graph may be represented by the above-noted edges in the user' social graph. As noted, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific in some cases. For example, social graph data may identify specific types of content associated with an edge between parties and specific affinities for that content. In an example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about baseball and a second, different level of affinity for the second party's content about basketball.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other. In still other examples, if two users interact with the same people regularly or frequently, those two users may be considered to have an affinity with one other.

Figure 4:
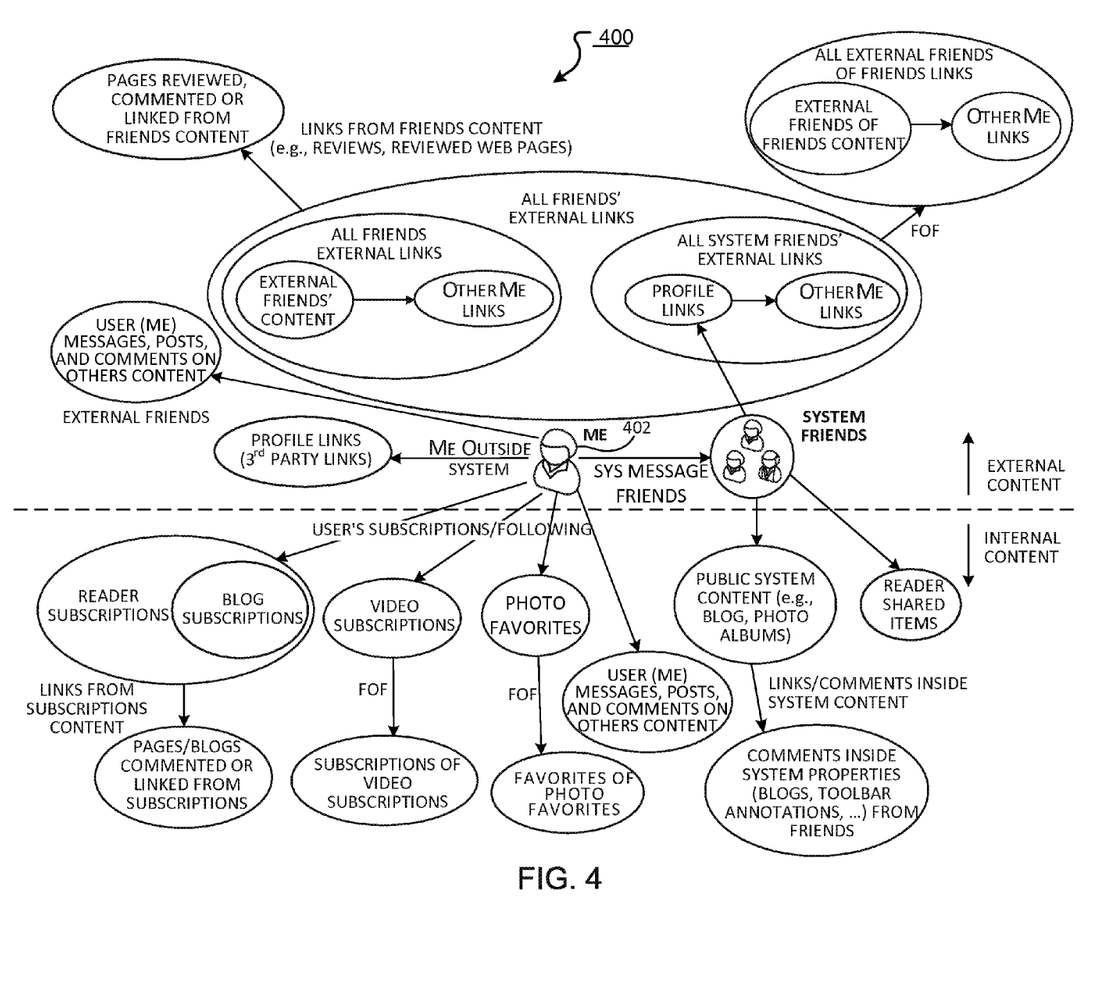
FIG. 4 is a conceptual view of an example of a social graph.

FIG. 4 is a conceptual view of an example social graph 400. Among other things, FIG. 4 shows sources of information for a social graph. In this example, the user's social graph is a collection of connections (e.g., users, resources/content, etc.) identified as having a relationship to the user 402 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 4 shows that it is possible to extend the user's social graph to people and content both within a single network and across one or more external networks. For example, the user may have a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profiles that include connections to resources as well as contacts of the respective contacts, a set of interests, and so forth. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index in the indexed cache 314 of FIG. 3. Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph).

The indexed social graph information may be updated intermittently or periodically, for example, to include recently added information associated with the user's social graph. The indexed social graph information may also be updated, e.g., on an on-going basis to reflect relationships determined in accordance with the processes described herein.

A user may prevent addition of members to the user's social graph, e.g., using an opt-out option or by keeping contacts out of particular groups used to generate the social graph. In some implementations, privacy features provide a user with an opt-in or opt-out option to allow or to prevent, respectively, being included (or removed the user if already included) as a member of another's social graph. Thus, users may have control over what personal information or connection information, if existing, is included in their social graphs and, consequently, that is included in the content streams and search results described herein.

Example System Implementations

Figure 5:
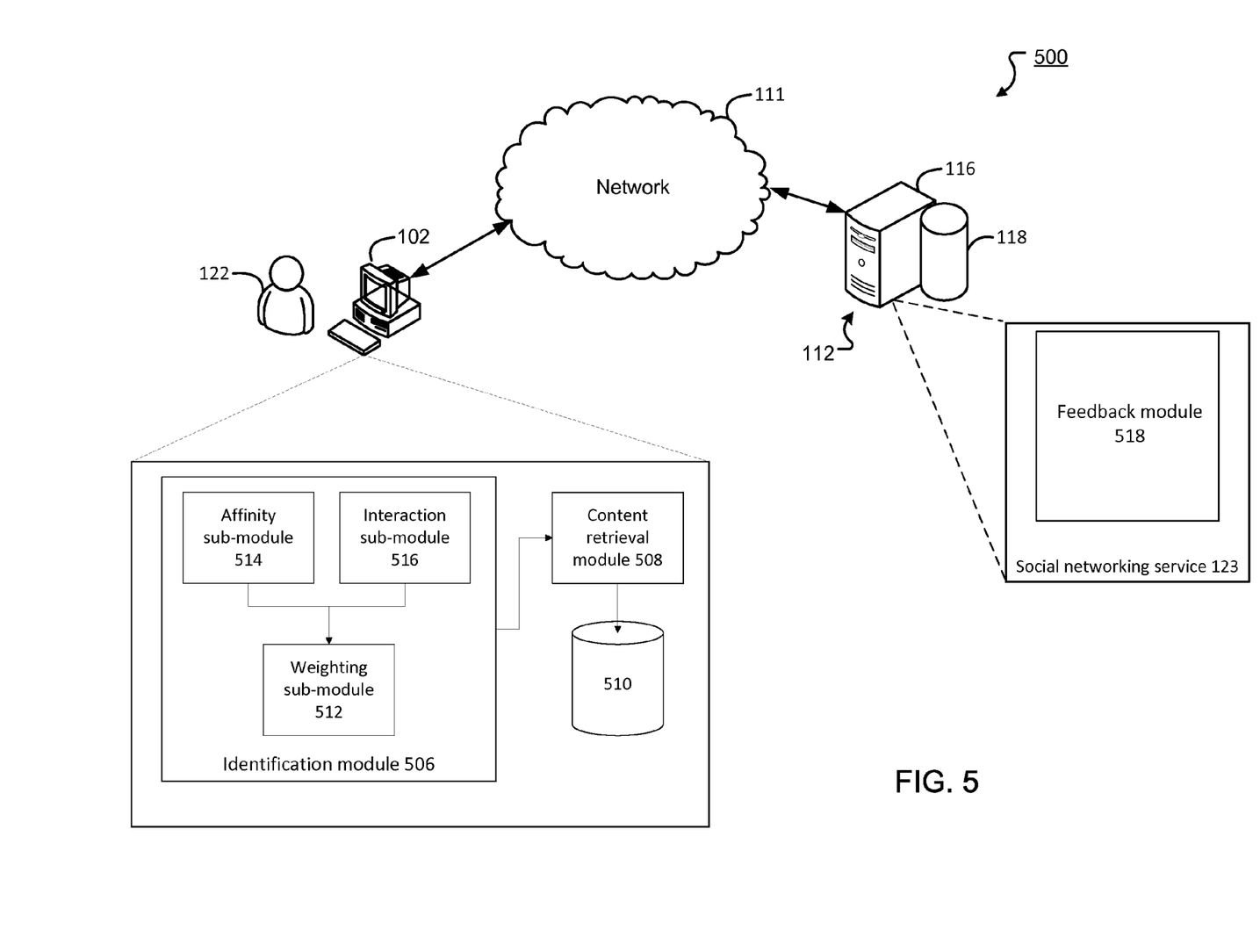
FIG. 5 is a schematic diagram of a content pre-fetching system in a social networking service.

FIG. 5 is a schematic diagram of a content pre-fetching system 500 for a social networking service 123 implemented in a client/server based environment. For a particular user 122 who is actively engaged with the social network 123 (e.g., user 122 is actively browsing content on the social network), an identification module 506 implemented in the user's computing device 102 identifies one or more target parties (e.g., other users or entities having a presence in the social network) as having associated content that is likely to be accessed by user 122. In the illustrated embodiment, party identification and other operations, such as content pre-fetching, are executed by client side devices. However, a portion or all of the operations may be executed by server-side components, distributed between client- and server-side computing devices, or implemented in one or more other types of computational architectures.

A content retrieval module 508 executed by the client computing device 102 retrieves ("pre-fetches") content specific to the identified target party or parties from the server system 112 prior to the user requesting some or all of the content. The pre-fetched content is stored in a readily accessible, temporary storage 510, such as, for instance memory in the user's computing device 102; memory on server 112; or memory on a local search server, such as a search server that is physically closer to the user or has a shorter network distance to the user than server 112; The pre-fetched content includes only content to which the user already has access (e.g., public content or content available via a pre-existing relationship in the social network). In some embodiments, caching of the pre-fetched content occurs only if the user has agreed to caching of the content and/or has opted into the use of the pre-fetching service provided by the social network.

When user 122 requests content that has been pre-fetched, e.g., by clicking on a link associated with the content, the content is already local to the user's computing device 102 and thus can be delivered to the user quickly and with little latency. If user 122 requests all of the content that has been pre-fetched, then the entirety of the content is served to the user. Alternatively, if user 122 requests only a portion of the content that has been pre-fetched, then the requested portion is provided. In some cases, the user may request some content that has been pre-fetched and other content that has not been pre-fetched; in this case, the user's computing device 102 may call the server system 112 to retrieve the content that is not already stored locally. In some embodiments, the pre-fetched content may be provided to the user prior to the content that is retrieved from the server system; in other embodiments, the pre-fetched content is delayed such that all content requested by the user is displayed at substantially the same time.

In this particular arrangement, the identification module 506 is illustrated as including three sub-modules for assisting in identifying one or more target parties. As illustrated in the figure, a weighting sub-module 512 assigns a weight to each party within the social graph of user 122 based on scores generated by an affinity sub-module 514 and/or an interaction sub-module 516. The weight assigned to each party may be indicative of the likelihood that the user 122 may be interested in accessing content specific to that party. In some embodiments, a higher weight indicates a higher likelihood; however, other weighting schemes are also possible.

Affinity sub-module 514 assigns a social affinity score to each party on the basis of a social affinity between the party and the user. In some embodiments, the social affinity score may reflect how the topographic distance between a party and the user correlates with the likelihood that the user will view content specific to that party. For instance, if a user is more likely to view the profile of a direct contact than the profile of a contact of a contact, then the contacts of the user may be assigned a higher social affinity score than the contacts of the contacts of the user. In some embodiments, the social affinity score may reflect how a user's interactions with a party (e.g., the frequency or type of interaction with content specific to the party) correlate with the likelihood that the user will view content specific to that party. For instance, if a user tends to view posts by a first contact more frequently than posts by a second contact, then the first contact may be assigned a higher social affinity score than the second contact. In some embodiments, contacts in certain social circles (e.g., a user's Close Friends circle) may be assigned a higher social affinity score than contacts in other social circles (e.g., the user's Acquaintances circle). Other models of social affinity may also be used to assign social affinity scores to parties in a user's social graph.

The social affinity score for a party may also be determined based in part on activity by the party. For instance, parties who have recently posted content on the social network may be assigned a higher social affinity score than parties who have not had any recent activity on the social network. The type of content posted may also be a factor in determining the social affinity score: for instance, parties who post rich media, such as photos or videos, may be assigned a higher social affinity score than parties who post plain text.

In some embodiments, the social affinity score may be assigned from a discrete or continuous spectrum of values. In other embodiments, the social affinity score may be represented by a binary value, for instance, indicative of whether a value representative of the social affinity between the user and a particular party exceeds a threshold social affinity value.

Interaction sub-module 514 assigns an interaction score to each party in the user's social graph on the basis of the user's interactions with the social network during one or more periods of time. For example, at one extreme, the user's long-term interactions with the social network, e.g., over the last year, or since the user became a member of the social network, can be considered to determine a baseline interaction score for each party. The baseline interaction score may reflect the types of interactions that the user commonly has with the social network. For instance, if a user generally views profiles of contacts that live in the same city as the user, those contacts are assigned a higher baseline interaction score than contacts who live elsewhere. At another extreme, the user's short-term interactions with the social network, such as the user's activity during a single active browsing session on the social network, can be used to determine an immediacy interaction score for each party. The immediacy interaction score may reflect the manner in which the user is currently interacting with the social network. For instance, a user may be viewing contacts from a particular social circle (e.g., contacts from the user's Grade School Friends circle) on a given day; as a result, the immediacy interaction score for all contacts in the user's Grade School Friends circle may be increased for that day and/or for the near future. In some embodiments, the overall interaction score assigned to each party in the user's social graph is determined based on a combination of the baseline interaction score, the immediacy interaction score, and/or other interaction scores, such as interaction scores representative of interactions during other periods of time.

In some cases, a user's interactions with the social network may reflect the type of content with which the user interacts. For instance, if a user preferentially views rich media files, then parties who have a large amount of rich media content may be assigned a higher interaction score. As another example, if a user often views any type of content associated with baseball, including photographs, blog posts, and news articles linked to from a post on the social network, then parties who have content that is related to baseball may be assigned a higher interaction score.

A user's interactions with the social network may be determined based on simple click data (i.e., which links the user clicks on). Alternatively, the user's interactions with the social network may be based on click data modified by an engagement parameter, which may indicate, for instance, how long a user engaged with a clicked link or with material associated with a clicked link.

The user's interactions with the social network may further include temporally based interactions. For instance, a user may interact differently with the social network depending on the time of day, day of the week, time of year, or other period of time. The interaction score for each party may be determined in part based on these temporal aspects. For instance, if a user accesses profiles of certain contacts primarily in the summer (e.g., because the user plays tennis with those contacts in the summer), the interaction score for those contacts may be increased during the summer. As another example, if a user accesses profiles of her coworkers during the week and profiles of her friends on the weekend, the interaction scores for her coworkers and friends can be adjusted according to the day of the week.

The social affinity score and the interaction score may be combined by weighting sub-module 512 to generate a weight for each party in a user's social graph. One or more of the most highly weighted parties may be identified as having a high likelihood of being of interest to the user. In some cases, the N parties having the highest weights are identified, where N is a number determined on a per client basis, e.g., to balance perceived latency with number of server calls. For instance, N may be dependent on the type of client platform (e.g., desktop computer, laptop computer, or mobile device) and/or the type of connection the client device has with the server (e.g., wireless Internet connection or mobile telephony connection.

Content retrieval module 508 pre-fetches content specific to the one or more most highly weighted parties from server system 112. For instance, the activity feed, profile information, photos, videos, and/or other content posted by or otherwise associated with the party may be retrieved. The pre-fetched content is stored locally on the user's computing device 102 in a temporary storage 510, from which it can be quickly retrieved upon request by the user.

A feedback module 518 determines time-based parameters based on the successes or failures, on a system-wide level and/or a per-user level, with which various factors predict the content that will be requested next by a user. The time-based parameters are provided to identification module 506 to promote successful factors and/or to punish unsuccessful factors used by affinity sub-module 514, interaction sub-module 516, and/or weighting sub-module 512 in the identification of target parties. In one example, the time-based parameters act as multipliers for the appropriate factors. In some cases, it may be possible for a particular factor (e.g., distance in the social graph) to have a positive system-wide multiplier (i.e., for a generic user, the factor is a successful predictor) while having a lower or even negative per-user score for a particular user (i.e., for that user, the factor is a less successful or unsuccessful predictor). In some instances, the time-based parameters may be instrumented and captured on a per-platform basis to reflect variations in user behavior among different client devices. In the illustrated embodiment, feedback module 518 is implemented by a server-side computing device; however, other implementations of feedback module 518 in other locations are also possible.

Example Processes

Figure 6:
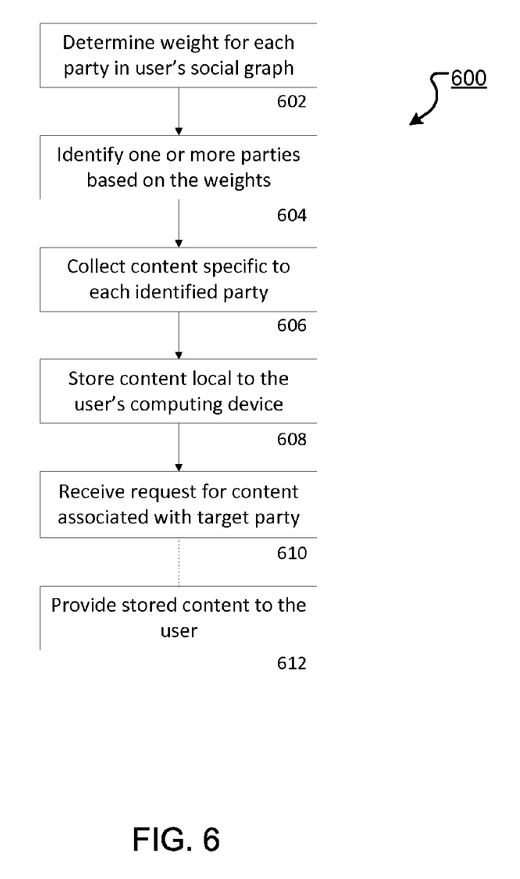
FIG. 6 is an example process flow for retrieving content in a social network.

FIG. 6 is an example process flow 600 for pre-fetching content specific to parties in a social network in which a user may have an interest. For a particular user, a weight is determined for each party in the user's social graph (block 602). For instance, as discussed above, the weight may be determined based on a combination of factors such as a social affinity between the user and each party and/or a social network interaction history of the user. Target parties in which the user is likely to exhibit an interest are identified based on the weight associated with each party (block 604). For instance, in one embodiment, one or more parties having the highest weight are selected as the target party or parties.

For each of the identified target parties, content specific to the target party is collected from the server system serving the social network (block 606) prior to receiving a request from the user for content associated with the target party. The collected content is stored in a readily accessible, temporary storage on the user's computing device (block 608). When a user request for content associated with the target party is received (block 610), such as by the user clicking on a link associated with the content, the content is provided to the user (block 612) directly from the local, temporary storage.

In some embodiments, the processes described above are executed by a client computing device, such as the user's computing device. In other embodiments, these processes are performed by a server, such as a server hosting the social network. In other embodiments, these processes may be distributed among multiple computing devices, which may be co-located or located in different locations. For instance, one or more steps may be performed by a first computing device while one or more other steps are performed by a second computing device. Alternatively, the execution of a single step may be distributed among multiple computing devices.

Example System Implementations

Figure 7:
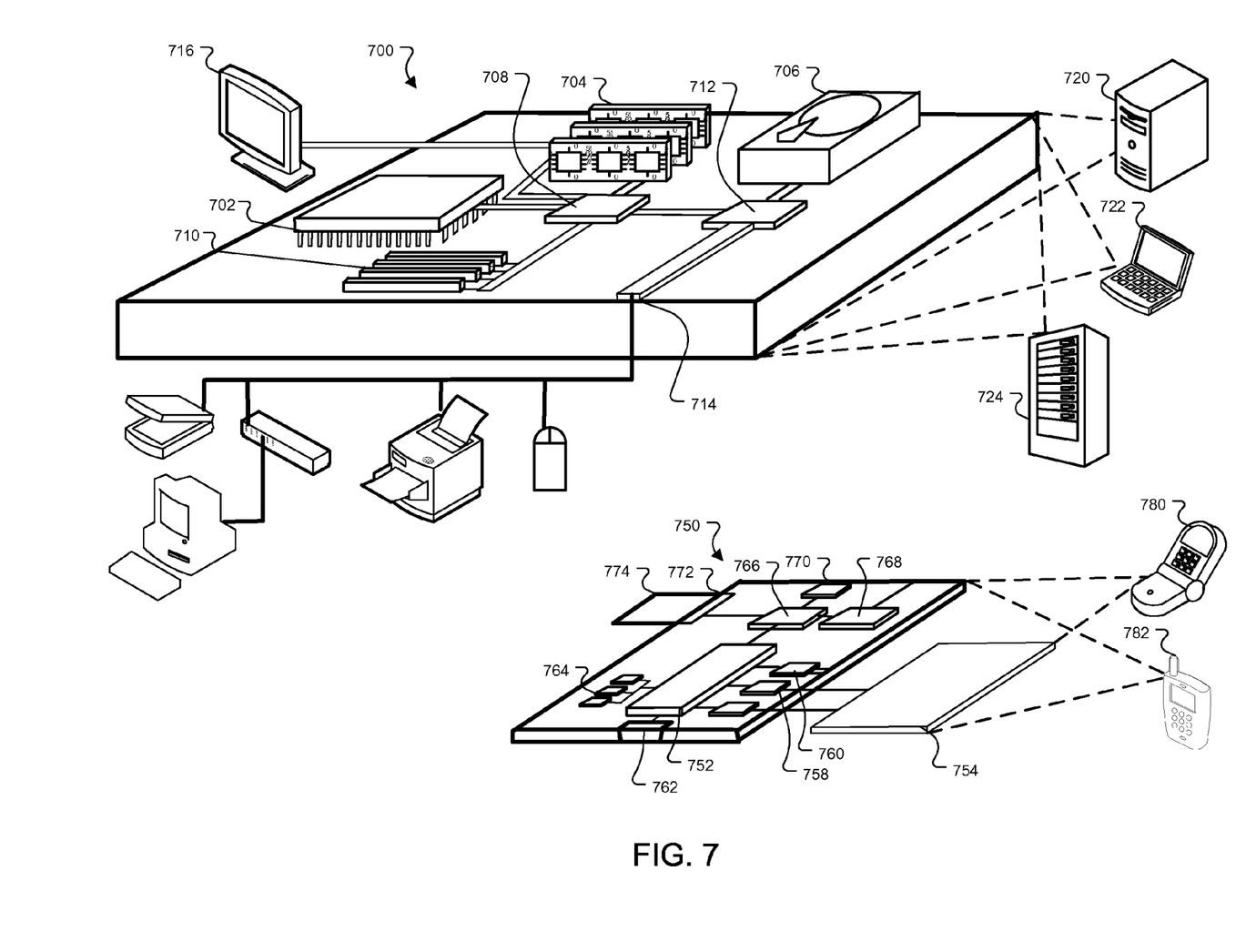
FIG. 7 is a block diagram of examples of computing devices.

FIG. 7 shows examples of computing devices on which the processes described herein, or portions thereof, may be implemented. In this regard, FIG. 7 shows an example of a generic computing device 700 and a generic mobile computing device 750, which may be used to implement the processes described herein or portions thereof. For example, search system 312 may be implemented on computing device 700. Mobile computing device 750 may represent a client device of FIG. 1. Other client devices of FIG. 1 may also have the architecture of computing device 700.

Computing device 700 is intended to represent various forms of digital computers, examples of which include laptops, desktops, workstations, personal digital assistants, servers, blade servers, mainframes, and other appropriate computers. Computing device 750 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, for example, display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, examples of which include a magnetic or optical disk.

The storage device 706 is capable of providing mass storage for the computing device 700. In one implementation, the storage device 706 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 704, the storage device 706, or memory on processor 702. For example, the information carrier may be a non-transitory, machine-readable storage medium.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer, e.g., a laptop computer 722. Alternatively, components from computing device 700 may be combined with other components in a mobile device (not shown), e.g., device 750. Each of such devices may contain one or more of computing device 700, 750, and an entire system may be made up of multiple computing devices 700, 750 communicating with each other.

Computing device 750 includes a processor 752, memory 764, an input/output device, e.g. a display 754, a communication interface 766, and a transceiver 768, among other components. The device 750 may also be provided with a storage device, e.g., a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, e.g., control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, e.g., using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, e.g., through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

For situations in which the systems and techniques discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

All processes described herein and variations thereof (referred to as "the processes") contain functionality to ensure that party privacy is protected. To this end, the processes may be programmed to confirm that a user's membership in a social networking account is publicly known before recommending a connection to that user through the social networking account. Likewise, the processes may be programmed to confirm that information about a party is publicly known before divulging that information to other party, or even before incorporating that information into a social graph.

In the context of this disclosure, the terms social network and social networking service may be used interchangeably.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    identifying, using one or more computing devices, a target party of a social network based on at least one of a social affinity between an active user of the social network and the target party and a social network interaction history of the active user; wherein the social affinity is based on a combination of (i) a separation distance, represented in a social graph, between the active user and the target party, and (ii) a membership of the target party in one or more of a plurality of groups defined by the active user and represented by at least a part of the social graph;
    collecting, using one or more computing devices, content specific to the identified target party prior to receiving a request from the active user for content associated with the identified target party, wherein the collecting includes using a crawling engine to crawl resources, an indexing engine to index the resources in one or more search indexes that include social graph information in the one or more search indexes, and a ranking engine to rank resources deemed relevant, wherein the indexing engine generates social restricts by mapping identified information to corresponding Web resources referenced in the one or more search indexes and determines the social connection between the Web resources and the active user;
    storing, using one or more computing devices, the collected content in a temporary storage;
    receiving, using one or more computing devices, a request by the active user requesting particular content associated with the target party, wherein the particular content is among the collected content specific to the identified target party that is stored in the temporary storage; and
    providing, using one or more computing devices, the particular requested content from the temporary storage to the active user, at least in part based on the request by the active user for the particular content associated with the target party.

2. The method of claim 1, wherein collecting content specific to the identified target party includes collecting data representative of at least one of recent activity by the target party in the social network, a profile associated with the identified target party, a media file associated with the identified target party, and contact information for the identified target party.

3. The method of claim 1, wherein the request by the active user includes an interaction with a link associated with the identified target party.

4. The method of claim 1, wherein storing the collected content in the temporary storage comprises storing the collected content in a storage coupled to a computing device associated with the active user.

5. The method of claim 1, further comprising:
    determining a weight for each of a plurality of parties based on at least one of a social affinity between an active user of the social network and the target party and a social network interaction history of the active user,
    wherein the target party is identified based on the weight of one or more of the plurality of parties.

6. The method of claim 1, wherein the social separation distance between the active user of the social network and the target party is based on a topographic distance represented in a social graph between the active user and the target party.

7. The method of claim 6, wherein the social affinity between an active user of the social network and the target party is based on an interaction between the active user and the target party.

8. The method of claim 7, wherein the interaction between the active user and the target party is based on at least one of a frequency and a recency of interactions between the active member and the target party.

9. The method of claim 1, wherein identifying a target party includes comparing a characteristic of content associated with the target party and a characteristic of content included in the social network interaction history of the active user.

10. The method of claim 1, wherein the social network interaction history represents interactions of the active user during a preselected period of time.

11. The method of claim 1, wherein identifying a target party is based on activity of the target party in the social network.

12. The method of claim 1, wherein identifying the target party is based on at least one of the social affinity and the interaction history modified by a feedback parameter representative of a historical performance of an identification of target parties.

13. The method of claim 12, wherein the feedback parameter is specific to the active user.

14. The method of claim 1, wherein the target party is a user of the social network.

15. The method of claim 1, wherein the target party is an entity having a presence on the social network.

16. One or more non-transitory machine-readable media storing instructions that are executable by one or more processing devices to perform operations comprising:
    identifying a target party of a social network based on at least one of a social affinity between an active user of the social network and the target party and a social network interaction history of the active user, wherein the social affinity is based on a combination of (i) a separation distance, represented in a social graph, between the active user and the target party, and (ii) a membership of the target party in one or more of a plurality of groups defined by the active party and represented by at least a part of the social graph;

collecting content specific to the identified target party prior to receiving a request from the active user for content associated with the identified target party, wherein the collecting includes using a crawling engine to crawl resources, an indexing engine to index the resources in one or more search indexes that include social graph information in the one or more search indexes, and a ranking engine to rank resources deemed relevant, wherein the indexing engine generates social restricts by mapping identified information to corresponding Web resources referenced in the one or more search indexes and determines the social connection between the Web resources and the active user;

storing the collected content in a temporary storage;

receiving a request by the active user requesting particular content associated with the target party, wherein the particular content is among the collected content specific to the identified target party that is stored in the temporary storage; and providing the particular requested content from the temporary storage to the active user, at least in part based on the request by the active user for the particular content associated with the target party.

17. The non-transitory machine-readable media of claim 16, wherein collecting content specific to the identified target party includes collecting data representative of at least one of recent activity by the target party in the social network, a profile associated with the identified target party, a media file associated with the identified target party, and contact information for the identified target party.

18. The non-transitory machine-readable media of claim 16, wherein the request by the active user includes an interaction with a link associated with the identified target party.

19. The non-transitory machine-readable media of claim 16, wherein storing the collected content in the temporary storage comprises storing the collected content in a storage coupled to a computing device associated with the active user.

20. The non-transitory machine-readable media of claim 16, storing instructions that are executable by the one or more processing devices to perform operations further comprising:

determining a weight for each of a plurality of parties based on at least one of a social affinity between an active user of the social network and the target party and a social network interaction history of the active user, wherein the target party is identified based on the weight of one or more of the plurality of parties.

21. The non-transitory machine-readable media of claim 16, wherein the separation distance between an active user of the social network and the target party is based on a topographic distance represented in a social graph between the active user and the target party.

22. The non-transitory machine-readable media of claim 21, wherein the social affinity between an active user of the social network and the target party is based on an interaction between the active user and the target party.

23. The non-transitory machine-readable media of claim 16, wherein identifying the target party is based on at least one of the social affinity and the interaction history modified by a feedback parameter representative of a historical performance of an identification of target parties.

24. A computer-implemented system comprising one or more processing devices; and one or more machine-readable media configured to store instructions that are executable by the one or more processing devices to perform operations including:

identifying a target party of a social network based on a combination of a social affinity between an active user of the social network and the target party and a social network interaction history of the active user wherein the social affinity is based on a combination of (i) a separation distance, represented in a social graph, between the active user and the target party, and (ii) a membership of the target party in one or more of a plurality of groups defined by the active party and represented by at least a part of the social graph;

collecting content specific to the identified target party prior to receiving a request from the active user for content associated with the identified target party, wherein the collecting includes using a crawling engine to crawl resources, an indexing engine to index the resources in one or more search indexes that include social graph information in the one or more search indexes, and a ranking engine to rank resources deemed relevant, wherein the indexing engine generates social restricts by mapping identified information to corresponding Web resources referenced in the one or more search indexes and determines the social connection between the Web resources and the active user;

storing the collected content in a temporary storage, receiving a request by the active user requesting particular content associated with the target party, wherein the particular content is among the collected content specific to the identified target party that is stored in the temporary storage, and providing the particular requested content from the temporary storage to the active user, at least in part based on the request by the active user for the particular content associated with the target party.

25. The computer-implemented system of claim 24, wherein collecting content specific to the identified target party includes collecting data representative of at least one of recent activity by the target party in the social network, a profile associated with the identified target party, a media file associated with the identified target party, and contact information for the identified target party.

26. The computer-implemented system of claim 24, wherein the request by the active user includes an interaction with a link associated with the identified target party.

27. The computer-implemented system of claim 24, wherein storing the collected content in the temporary storage comprises storing the collected content in a storage coupled to a computing device associated with the active user.

28. The computer-implemented system of claim 24, wherein the identification module is further configured to perform operations including:

determining a weight for each of a plurality of parties based on at least one of a social affinity between an active user of the social network and the target party and a social network interaction history of the active user, wherein the target party is identified based on the weight of one or more of the plurality of parties.

29. The computer-implemented system of claim 24, wherein the separation distance between an active user of the social network and the target party is based on a topographic distance represented in a social graph between the active user and the target party.

30. The computer-implemented system of claim 24, wherein identifying the target party is based on at least one of the social affinity and the interaction history modified by a feedback parameter representative of a historical performance of an identification of target parties.

* * * * *